Feb. 28, 1961     P. SHAW     2,973,427
MACHINE TOOL CONTROL
Filed Dec. 29, 1959
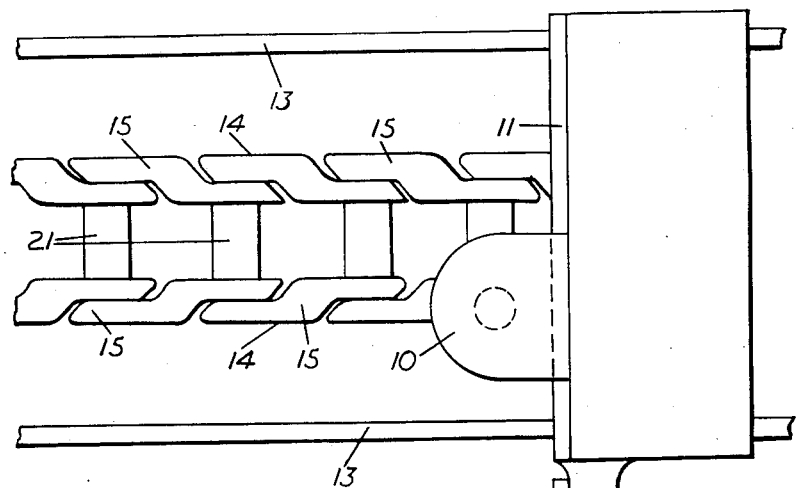
FIG. 1.
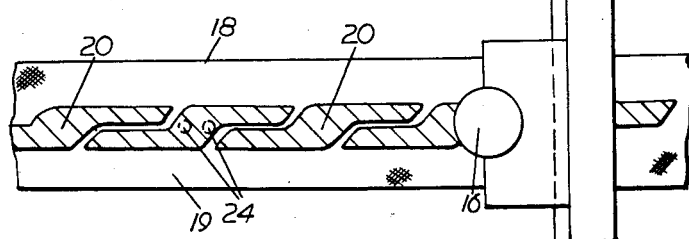
FIG. 2.
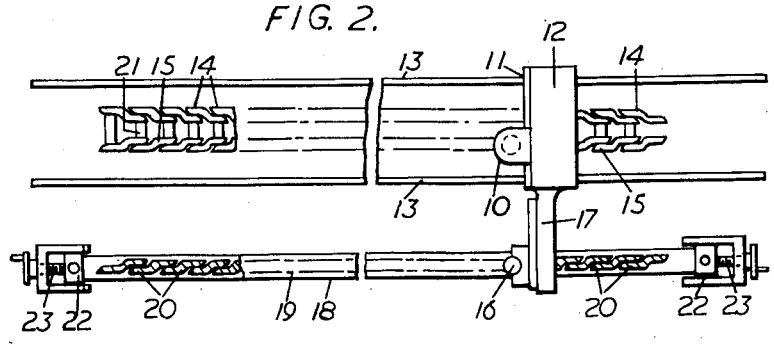
Inventor
PETER SHAW
By *[signature]*
Attorney United States Patent Office 2,973,427
Patented Feb. 28, 1961

2,973,427

MACHINE TOOL CONTROL

Peter Shaw, Gosforth, Newcastle-upon-Tyne, England, assignor to The British Oxygen Company Limited, a British company Filed Dec. 29, 1959, Ser. No. 24,863

Claims priority, application Great Britain Jan. 1, 1959

5 Claims. (Cl. 219—125)

This invention relates to the control of machine tools, automatic welding machines for example, during relative movement between the tool and a workpiece.

Where identical sequences of operations are performed in turn along the lengths of similar workpieces by a machine tool, the machine tool can often conveniently be controlled from a pattern or template. The pattern or template can be scanned by a photo-electric or other sensing device which is arranged to stop, start or modify the operation of the machine tool or to change the direction and/or speed of relative movement between the tool and a workpiece at points spaced along the length of the workpiece as required during the operation. However if the workpieces are not all of a standard length, but still require the same sequence of operations to be carried out at points which are similarly proportionally spaced in relation to the actual length of an individual workpiece, then a number of patterns or templates may have to be provided to cater for the range of dimensions to be dealt with.

One example of a machine tool controlled by a pattern template is an automatic arc welding machine used for re-surfacing the links of articulated tracks such as are used on crawler tractors. These links are subject to wear on the surfaces which engage the driving sprockets and idler rollers of the tractor. These surfaces, or the portions thereof subjected to wear, may be of different shape and size on articulated tracks of different manufacture and size. In one type of track each track link comprises two side members having such wearable surfaces and spaced apart by a pin which pivotally connects this track link to a similar adjacent track link.

The surfaces referred to are re-surfaced by moving an arc welding head relatively to an articulated track, the arc welding head being arranged to deposit a layer of wear-resisting or other alloy onto the worn surfaces. This relative movement may be effected by repeatedly moving the welding head along the length of the track and progressively moving the welding head across the width of the surface before each longitudinal movement. In order to prevent metal being deposited between the track links it is necessary to start or stop welding at the end of each part of a track link surface which is traversed by the welding head during each longitudinal movement. Control of the arc welding head for this purpose can be effected by a photo-electric sensing device which scans a pattern extending alongside the articulated track and bearing a full size outline of the series of surfaces of the articulated track to be re-surfaced. For example this outline may be printed in white on a black background, or vice versa.

Owing to wear at the pivotal connections between adjacent track links an articulated track tends to become longer after use. The stretch may be of the order of two inches in a thirty foot length of track and this is sufficient to result in incorrect control of the arc welding head by the pattern, especially during the latter part of each longitudinal movement of the head along the track.

It is an object of the present invention to provide means for overcoming this difficulty by providing a pattern or template which is suitable for use both with new and worn articulated tracks.

According to the present invention, a method of operating separately upon individual similar elongated workpieces which may vary from one to another from a standard length, comprises the steps of controlling operations of a machine tool during its movement relative to a workpiece by means of a sensing device which is responsive to a pattern or template representative of the workpiece, said pattern or template being resiliently extensible and being in a temporarily stretched condition corresponding to the length of said workpiece while the latter is being operated upon.

Apparatus according to the invention may comprise a machine tool for operating upon elongated workpieces, a sensing device for controlling operations of said machine tool during its movement relative to a workpiece, a resiliently extensible pattern or template which is representative of said workpiece, and means for retaining said template in a location for sensing by said sensing device and for temporarily stretching said pattern or template to correspond with the length of the workpiece.

The sensing device may be a photo-electric device which is responsive to a pattern comprising indicia carried by a strip of resilient material.

Alternatively the pattern or template may comprise a strip of resilient material to which non-resilient members are attached for sensing by a sensing device.

In a further alternative, the pattern or template may comprise a series of individual pattern or template members of non-resilient material, secured one to another in line by resilient connecting elements which may be in the form of metal extension springs. In this latter connection the pattern or template members may be slidably engaged with a common elongated guideway which retains the pattern or template in a location for sensing thereof, and with which may be incorporated means for stretching the pattern or template to a desired length.

The connection of adjacent pattern or template members by extension springs may impose an undesirable limitation upon the maximum distance to which adjacent members can be spaced apart by stretching the springs, and the invention further provides that the extension springs connect alternate members in the line, so that longer springs capable of considerable extension are utilised.

Embodiments of the invention will now be described with reference to the accompanying drawings, in which:

Fig. 1 is a fragmentary diagrammatic plan view, showing a portion of an automatic arc-welding machine for re-surfacing the links of an articulated track, and includes a resiliently extensible pattern or template.

Fig. 2 is a fragmentary plan view, to a reduced scale, showing more of the same machine of which a portion is shown in Fig. 1.

Referring to Figs. 1 and 2 of the drawings, an automatic arc welding head is indicated diagrammatically at 10 as being adjustable laterally on a guideway 11 of a carriage 12, said carriage being movable bodily along longitudinal guide rails 13. The carriage 12 is moved along the rails 13 at welding speed, e.g. by an electric driving motor (not shown), while the machine tool constituted by the arc welding head 10 operates upon a workpiece consisting of an articulated track, of which the links are indicated at 14. The function of the arc welding head 10 is to deposit a layer of wear-resisting alloy on the link surfaces 15 indicated in Fig. 1 of the drawings, these surfaces 15 being those which engage the driving sprockets and idler rollers of an endless track vehicle. Since these link surfaces 15 are the only parts of an articulated track with which the invention is concerned, no attempt is made to illustrate any more of the track than the links 14.

The operation of the arc welding head as regards stopping welding at a gap between adjacent links 14 is controlled by a photo-electric sensing device, indicated diagrammatically at 16, which is shown as supported by an arm 17 extending from the carriage 12. The sensing device scans an elongated pattern, indicated generally by the reference numeral 18, which is representative of the workpiece which the arc welding head is operating upon. As can be seen most clearly in Fig. 1 the pattern consists of a strip 19 of light-coloured background material, bearing a series of dark-coloured shapes 20 which are duplicates of the link surfaces 15. The sensing device 16 stops the welding operation of the head 10 when the light-coloured background is sensed, and re-starts the welding when the dark shapes are sensed. Obviously the pattern strip 19 could be of dark material with light-coloured shapes thereon, if desired, or the strip could be of transparent material, or the strip 19 could be opaque and the shapes 20 transparent, and the sensing device could be operated by direct light or reflected light.

Owing to wear on the pivotal connection between adjacent track links (e.g. the pivot pins 21 seen in the drawings), an articulated track for re-surfacing may be longer than it was when new, and as already mentioned earlier, the degree of stretch may be of the order of two inches in a track thirty feet in length. To compensate for this stretching of the track, the pattern strip 19 is made of resiliently extensible material, so that the pattern strip can be stretched to correspond exactly with the length of the particular articulated track to be operated upon. In Fig. 1 the pattern strip 19 is indicated as being of woven material, the woven strands of which may consist of or incorporate rubber, but other materials, which can be stretched to the extent of the order of 3% of their natural lengths (and probably not more than 5% at the most) without acquiring permanent set, can be used for the pattern strip.

As can be seen in Fig. 2 the pattern 18 is located alongside the articulated track to be operated upon for sensing by the sensing device 16, and having been stretched to correspond exactly with the length of the track, the pattern 18 is retained in its temporarily stretched condition by end clamps indicated diagrammatically at 22 in Fig. 2.

Obviously it is desirable that at least one of the end clamps 22 should be adjustable for stretching the pattern strip lengthwise, but the drawing indicates that both are adjustable as by manual screw mechanisms 23, thus avoiding the need to manoeuvre one end of the track and the strip into exact alignment before clamping the strip at the end.

It is preferred that the resiliently extensible pattern strip be very slightly shorter than a new articulated track of which the strip is representative, so that a degree of stretching is always applied to the strip in use.

The pattern may be readily produced by printing the shapes 20 on the resiliently extensible strip 19, e.g. black shapes upon a white or transparent background, or vice-versa, but it will be appreciated that stretching the whole length of the printed pattern will also cause some elongation of the shapes printed on the pattern. However, this stretching of shapes will probably not be more than 5% of their lengths at the most, and so will not have an appreciable effect on the re-surfacing operation. If this stretching of the shapes is to be avoided, or for other reasons, an alternative construction of pattern can be adopted.

In this case the shapes are not printed on a strip of resilient material, but are provided by members cut out from metal or other non-resilient sheet material and attached to the strip at the appropriate locations along its length. The means for attaching these members to the strip preferably should not materially affect the extensibility of the strip, and each member should therefore be so attached that a minimum portion of the strip is prevented from stretching freely. It may be necessary to use a strip of resilient material having greater elasticity than mentioned above if the attached members have a considerable effect on the stretching of the strip.

This last-described arrangement can be described by referring to Fig. 1, and by explaining that the shapes 20 are sheet metal members, each individually secured to the resiliently extensible strip 19 by two studs indicated 24 on one of said shapes, the two studs 24 being close together so as not to affect the extensibility of the strip.

The use of shaped members attached to a resilient strip offers the possibility of replacing one set of shaped members with a different set when different types of articulated track are to be re-surfaced.

The invention has been described with reference to the re-surfacing of articulated track links by deposition welding, using a pattern sensed by a photo-electric device. The scope of the invention is not so limited, either in its application to re-surfacing of track links or the use of photo-electric pattern sensing. A mechanical sensing device co-operating with an extensible template is also envisaged.

What I claim is:

1. In a machine for performing a sequence of identical operations along the length of an elongated workpiece, having a machine tool movable along said workpiece, a pattern representative of said workpiece and a sensing device responsive to said pattern for controlling operation of said machine tool, the combination of a resiliently extensible pattern and means for retaining said pattern in a temporarily stretched condition for sensing by said sensing device.

2. In a machine for performing a sequence of identical operations along the length of an elongated workpiece, having a machine tool movable along said workpiece, a pattern representative of said workpiece and a sensing device responsive to said pattern for controlling operation of said machine tool, the combination of a strip of resiliently extensible material of unextended length slightly less than the length of said workpiece, indicia printed on said strip in contrast therewith to provide pattern markings representative of selected areas of said workpiece for sensing by said sensing device, means for retaining said pattern in a location for sensing by said sensing device, and means for temporarily stretching said strip endwise to make said pattern markings agree exactly with said workpiece as regards lateral alignment.

3. In a machine for performing a sequence of identical operations along the length of an elongated workpiece, having a machine tool movable along said workpiece, a pattern representative of said workpiece and a sensing device responsive to said pattern for controlling operation of said machine tool, the combination of a strip of resiliently extensible material of unextended length slightly less than the length of said workpiece, pattern members of non-extensible material secured to said strip in spaced longitudinal alignment to provide representations of selected areas of said workpiece for sensing by said sensing device, means for retaining said pattern in a location for sensing by said sensing device, and means for temporarily stretching said strip endwise for increasing the spacing between said pattern members and thereby orientating said pattern members with said workpiece as regards lateral alignment of the pattern members and the selected areas of the workpiece.

4. In an elongated pattern for machine tool control by sensing of said pattern by a sensing device, the combination of a strip of resiliently extensible material, with sensable pattern indicia comprising a line of endwise spaced identical markings on said strip, the endwise spacings between said marking being variable simultaneously and equally by endwise stretching of the strip.

5. In an elongated pattern for machine tool control by sensing of said pattern by a sensing device, the combination of a strip of resiliently extensible material with multiple sensable non-extensible pattern members secured to a face of said strip in line with endwise spacings between adjacent pattern members, the endwise spacings being variable simultaneously and equally by endwise stretching of the strip.

References Cited in the file of this patent

UNITED STATES PATENTS

| | | |
|---|---|---|
| 2,030,689 | Dorrat | Feb. 11, 1936 |
| 2,329,818 | Brackett | Sept. 21, 1943 |
| 2,777,201 | Wetzel | Jan. 15, 1957 |